UNITED STATES PATENT OFFICE.

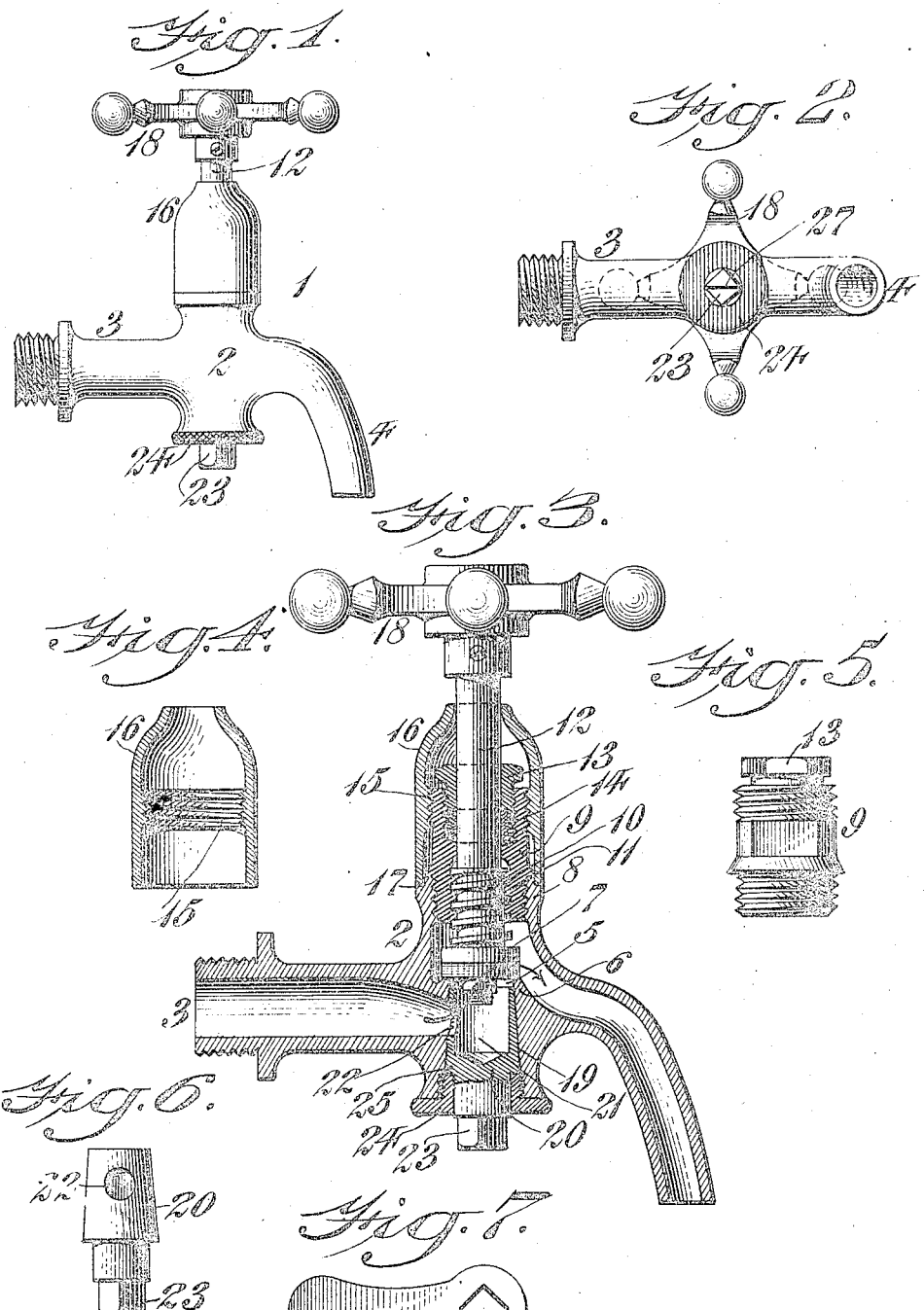

GUSTAV PEILEKE, OF CHESTER, PENNSYLVANIA, ASSIGNOR OF THIRTY ONE-HUNDREDTHS TO JOSEPH J. McLAUGHLIN AND TWENTY ONE-HUNDREDTHS TO CORNELIUS BROICH, OF CRUM LYNNE, PENNSYLVANIA.

VALVE.

No. 914,069.  Specification of Letters Patent.  Patented March 2, 1909.

Application filed July 9, 1908. Serial No. 442,690.

*To all whom it may concern:*

Be it known that I, GUSTAV PEILEKE, a subject of the Emperor of Germany, residing at Chester, Delaware county, State of Pennsylvania, have invented a new and useful Valve, of which the following is a specification.

My invention relates to a new and useful valve, wherein I provide means for controlling the flow of fluid therethrough and means for completely stopping the flow independent of the controlling means.

It further consists of a new and novel support for the controlling valve.

It further consists of other novel features of construction, all as will be hereinafter fully set forth.

Figure 1 represents a side elevation of a faucet embodying my invention. Fig. 2 represents a bottom plan view thereof. Fig. 3 represents a vertical sectional view thereof. Fig. 4 represents a sectional view of a cap employed, in detached position. Fig. 5 represents a side elevation of a portion of the supporting means for the controlling valve. Fig. 6 represents an elevation of a plug valve employed. Fig. 7 represents a view showing a tool for operating the plug valve.

Similar numerals of reference indicate corresponding parts in the figures.

Referring to the drawings. I have found in practice that it is often necessary and essential that the flow of fluid through a valve should be entirely shut off without interfering with the flow through other valves. My invention is designed to accomplish this result and in the drawings I have shown a construction which I have found will operate successfully in practice but it will be evident that the parts may be varied, the arrangement of the same may be changed and other instrumentalities may be employed which will come within the scope of my invention and I do not therefore desire to be limited in every instance to the exact construction as herein shown and described but desire to make such changes as may be necessary.

It will be understood that my valve is applicable to any form of valve but in the drawings, I have shown the same as applied to a faucet and that I provide each faucet in addition to this controlling valve, with means for entirely stopping the flow of fluid, whereby the operating valve may be removed and repairs made thereto without interfering with the other faucets in use, the advantages of which will be apparent from the present practice where it is necessary, should repairs be required, to stop the flow of the fluid to every and all of the faucets in a house or other locality. I desire it understood that while I will describe my invention as applied to the faucet, I desire it to be used in any desired construction.

1 designates the facuet having the casing 2 provided with an inlet 3 and a discharge or outlet 4. In the casing is a port 5 around which is a valve seat 6. 7 designates a valve adapted to coact with said seat, said valve being formed in any well known or desired manner. 8 designates an extension on said casing 2 provided with screw threads to which is adapted to be secured a plug 9 which is provided on its bore with screw threads 10 adapted to receive the threaded portion 11 of the valve stem 12 which extends upwardly through the bore of the plug, said plug also having the nut 13 in threaded engagement therewith for holding the packing 14 in position. An exterior portion of the plug 9 is also threaded to engage with the threads 15 of the cap or cover 16 which is adapted to rest upon the upper portion of the extension 8 of the casing 2, in the present instance upon the shoulders 17 formed thereon, it being understood that the cap is provided with a suitable opening to embrace the stem 12 which latter is provided with a hand-wheel 18 for rotating said stem, any suitable means for connecting the hand wheel 18 with the threaded stem being employed.

The lower portion of the casing 2 is provided with an opening 19 in which is seated a plug valve 20 which forms a ground joint with the wall of said opening 19, said plug valve having a suitable recessed portion or bore 21 and a port or opening 22 through the wall thereof which, when in proper position therefor, forms a communication between the inlet 3 and the recessed portion 21 of the plug valve and thus to the port 5 of the casing. The end 23 of said plug valve is squared and projects below the casing 2 for engagement with a suitable tool. The plug 20 is held in position in any desired manner, in the present instance, by the washer 24 which is in suitable threaded engagement with the casing 2 and abuts against a shoulder 25 on said plug valve.

26 designates a spanner wrench or other suitable tool having a squared opening adapted to engage the squared end 23 of the plug valve for rotating the same.

The operation of the parts just described will be apparent. When the plug valve 20 is turned in the position seen in Fig. 3, the port 22 is in register with the inlet 3, so that the fluid passing through the inlet will be directed into the recessed portion or bore 21 but as the valve 7 is seated upon its seat 6 further passage of the fluid is prevented. By the proper rotation of the hand-wheel 18, the valve stem 20 is rotated and as the same is in threaded engagement with the plug 9, which is stationarily supported by the casing 2, the said valve 7 will be raised so that the water or fluid will pass through port 5 and be directed through the outlet or discharge 4. By the reverse movement of the hand wheel 18 the valve 7 is closed preventing further passage of the water. If, however, for any reason it is desired to repair the faucet or parts thereof or if it is desired to entirely turn off the water independently of the valve 7 by the proper rotation of the plug valve 20, the port 22 therein is removed from its position in communication with the inlet 3, which is thus closed by the wall of the plug valve 20, and further passage of the water is completely cut off after which by removing the hand wheel 18 the cap or cover 16 can be unscrewed from the plug 9 and the latter can also be removed from engagement with the casing 2 if this be necessary, thus removing the valve 7 and the operating parts. By again turning the plug 20 and thus causing the port 23 to register with the inlet 3 which can be done by proper rotation of the plug valve 20, the passage of the fluid will be again controlled by the valve 7. I provide a suitable mark or indicator as at 27 on the plug valve 20 to indicate the position to which it should be turned to either cut off or permit the flow of the fluid.

From the above it will be understood that I provide a valve for the opening and closing of the faucet and I provide an auxiliary means for entirely shutting off the water by which means each faucet in a building can be separately controlled for entirely shutting off the water for repairs, etc., without discontinuing or shutting off the entire water supply in said building.

Having thus described my invention, what I claim as new and desire to secure by Letters Patent, is:—

In a faucet, a casing, an inlet and outlet therefor, a port between said inlet and outlet, a valve controlling said port, a valve stem, a plug in threaded engagement with said casing and with said valve stem, a cap or cover in threaded engagement with said plug and disconnected with and abutting against a shoulder on said casing to completely inclose said plug but permitting free movement of the stem and a nut engaging the interior of said plug and out of contact with said cap.

GUSTAV PEILEKE.

Witnesses:
WM. CANER WIEDERSEIM,
C. D. MCVAY.